Patented Aug. 1, 1944

2,354,895

UNITED STATES PATENT OFFICE 2,354,895

PURIFICATION OF DICYCLOPENTADIENE

Alger L. Ward, Drexel Hill, Pa., assignor to The United Gas Improvement Company, a corporation of Pennsylvania No Drawing. Application June 27, 1940,
Serial No. 342,711

9 Claims. (Cl. 260—666)

This invention pertains generally to the recovery and purification of cyclopentadiene in its dimeric form from crude mixtures thereof with other materials which may or may not be of similar characteristics.

The invention pertains more particularly to the purification of a crude cyclopentadiene or dicyclopentadiene containing material derived from the light oil obtained when gas is manufactured by the pyrolytic decomposition of petroleum oil, with or without the aid of catalysts.

The invention pertains still more particularly to the purification of light oil cyclopentadiene and dicyclopentadiene fractions with the eventual recovery of dicyclopentadiene ($C_{10}H_{12}$) in the pure or substantially pure form.

In various processes for the manufacture of artificial gases, such as oil gas or carburetted water gas, considerable quantities or tar are produced as well as substantial quantities of other readily condensible materials. Various components of the gas may be separated therefrom, for example in condensing and/or scrubbing equipment associated with the gas-making apparatus.

The condensate as well as distillate from the tar are generally designated as "light oil" and comprise a valuable source for dicyclopentadiene, as well as other hydrocarbons saturated and unsaturated and including crude cyclopentadiene to be more fully referred to hereinafter.

Using conventional methods of fractional distillation it is impracticable to obtain a separation of the dicyclopentadiene in a relatively pure state because of the presence in the complex mixture of other materials which apparently are of similar boiling point, or are capable of forming azeotropic mixtures with the desired hydrocarbon. Examples of common contaminants boiling too close to dicyclopentadiene for separation by fractionation under practicable conditions are the dimers of isoprene and piperylene. These are normally present in substantial quantities unless the dicyclopentadiene has been separated by my selective dimerization process described and claimed in my copending application Serial Number 170,508, filed October 22, 1937, now Patent 2,261,038, dated August 13, 1940. Moreover, dicyclopentadiene is thermally unstable and tends to lose its identity with heat, which further adds to distillation difficulties.

In my said copending application, I have disclosed and claimed a method for separating cyclopentadiene (B. P. about 40° C.) from a complex mixture including various other thermally unstable hydrocarbons of similar characteristics; such as for example unsaturated hydrocarbons of similar boiling point, of which latter isoprene (B. P. about 34° C.) and piperylene (B. P. about 43° C.) may be mentioned as typical examples.

Such method briefly summarized is based upon the discovery that cyclopentadiene may be selectively polymerized to the dimer in the presence of isoprene, piperylene and other hydrocarbons without at the same time polymerizing large proportions of such other materials. Accordingly, by subjecting the crude cyclopentadiene mixture under superatmospheric pressure to an elevated temperature preferably considerably above the initial boiling point thereof (i. e., the initial boiling point of the monomeric mixture at atmospheric pressure), the desired selective dimerization of cyclopentadiene is effected.

The temperatures indicated in said copending application as practicable vary from about 40° C. to 170° C., while the preferred temperatures are in the neighborhood of 100° C. Temperatures in the range of about 80° to 120° C. represent a very satisfactory secondary range for carrying out the selective dimerization.

Superatmospheric pressures such as those sufficient to substantially maintain the reactants in the liquid phase are preferably employed.

As a result of the selective polymerization there is obtained a mixture of dicyclopentadiene and low boiling hydrocarbons which latter materials pass through the polymerization procedure with little or no change due to polymerization. As indicated in my said copending application, since the dicyclopentadiene boils at a much higher level that any unchanged cyclopentadiene and other low boiling unsaturated hydrocarbons originally present in the mixture, the separation of such low boiling materials may be brought about by resorting to distillation preferably finishing at reduced pressures such as 40 mm. Hg or lower, to avoid, insofar as is practicable, unnecessary exposure of these heat-sensitive materials to elevated temperatures.

The dicyclopentadiene thus separated from the low boiling material is still contaminated with small quantities of dimers of other unsaturates present in the original mixture. It is extremely difficult, if not impossible, to remove such dimers by distillation alone, although a satisfactory separation may be made by depolymerizing the dicyclopentadiene to cyclopentadiene which in turn might be dimerized to dicyclopentadiene.

I have discovered that pure dicyclopentadiene may be readily separated from the other dimers present in the above mixture, or indeed from any other source of dicyclopentadiene such as that obtained by distillation directly from light oil, by a method of fractional crystallization.

Fractional crystallization, as a general method of separating or recovering organic compounds from mixtures thereof, is of course broadly old. Numerous laboratory and industrial procedures are based upon or include such a step. However, so far as I am aware, it has never before been proposed that dicyclopentadiene be recovered from crude mixtures thereof by a method wherein the mixture is subjected to suitable cooling in temperature ranges which permit the recovery of dicyclopentadiene as well-formed, easily filtered crystals of high purity. The recovery of dicyclopentadiene from crude materials containing it by fractional crystallization, particularly when combined with my process for selectively dimerizing the monomer to the dimer, or my preferred pretreatment of light oil by fractional distillation to obtain a crude dicyclopentadiene directly for treatment, constitutes a particularly useful method for obtaining commercial yields of dicyclopentadiene of high purity from light oils obtained in the manufacture of gas, or from other sources.

My invention makes it possible to isolate substantially pure dicyclopentadiene from the products of the pyrolytic decomposition of oil without resorting to the steps of depolymerization and repolymerization described in my copending application.

By utilizing fractional crystallization—repeated one or more times, if necessary or desired—to recover dicyclopentadiene, substantial freedom thereof from impurities, some of which (e. g., sulfur compounds) are extremely difficult to eliminate, is assured.

Certain impurities such as sulfur compounds may have a very harmful effect on the toughness, color, light-stability, electrical and other properties of resins prepared from cyclopentadiene, or directly from dicyclopentadiene. Such sulfur compounds are inherent in crude cyclopentadiene and crude dicyclopentadiene derived from light oil obtained in the manufacture of gas because at least traces of sulfur are present in all petroleum oils, coal, and coke. The sulfur compounds may be present in very small concentration, the sulfur content often being of the order of 0.1% or less. Impurities in such low concentrations can seldom be removed by fractionation. The production of a high quality cyclopentadiene or cyclopentadiene resin may require their removal down to a small fraction of this 0.1%.

I have discovered that fractional crystallization can be used under certain conditions to recover dicyclopentadiene from crude sources thereof in a form which is free from harmful traces of sulfur and other undesirable compounds. Simultaneously, it removes other hydrocarbons with which the dicyclopentadiene is associated such as the dimers of isoprene and piperylene and other hydrocarbons of similar boiling range.

The crude dicyclopentadiene material with respect to which the process of my invention is particularly applicable is not only the dimerized crude cyclopentadiene above referred to but also a crude dicyclopentadiene fraction derived directly from the so-called "light oil" by any suitable method, such as distillation. Thus, light oil may be subjected to fractional distillation to obtain a light oil fraction of a desired boiling range. Preferably distillation takes place with vacuum as distinguished from steam and under conditions such that pot temperatures do not exceed 140° C.

Pure dicyclopentadiene boils at approximately 170° C. at 760 mm. with decomposition to the monomer. At 40 mm. pressure pure dicyclopentadiene boils at approximately 80° C. Thus, the crude fractions of light oil from which dicyclopentadiene may be recovered by my process broadly speaking may have any reasonable boiling range such as between 72° C. and 85° C. at 40 mm. pressure or the equivalent at any other suitabl pressure.

However, I find it highly desirable to use crude dicyclopentadiene fractions with boiling ranges which do not greatly exceed 75° C. to 83° C. at 40 mm. or the equivalent.

Excellent results are obtained when using crude dicyclopentadiene fractions with boiling ranges within about 77° C. to 82° C. at 40 mm. or the equivalent.

In practicing my invention, I subject the crude dicyclopentadiene irrespective of source to fractional crystallization and separate the crystals which are of substantially pure dicyclopentadiene from the mother liquor by any suitable means such as filtration usually with washing to remove the last vestiges of mother liquor from the crystal faces. Any suitable filter may be employed such as a plate filter, a rotary filter or a centrifuge, and washing may take place while the crystallized mass is on the filter bed by passing the wash liquid therethrough.

In carrying out the crystallization step, I take care not to have too small a portion in the liquid phase because I depend at least in part upon the mother liquor to retain in solution the sulfur compounds and/or other impurities. In fact, I may add a suitable diluent to aid in this purpose. Furthermore a properly chosen diluent reduces the viscosity of the mixture, thus making it easier to effect a clean separation of the crystals from the mother liquor and moreover reduces the tendency for mixtures relatively lean in dicyclopentadiene to freeze to a glass-like solid rather than to a crystal mush. In any case, I preferably do not attempt to separate the dicyclopentadiene crystals when the mother liquor is less than about 40% of the total mixture (in other words, when the crystals content of the total mixture exceeds about 60%), unless the starting material is already relatively pure.

Upon cooling a crude dicyclopentadiene-containing material of any composition greater than about 90% in dicyclopentadiene, relatively pure dicyclopentadiene crystals separate from the mother liquor provided the mother liquor is not depleted in dicyclopentadiene content much below 85% at the time of its separation from the crystals. In case a diluent is added the same percentages apply neglecting the diluent. Preferably, however, the dicyclopentadiene content of the total mixture (including diluent) at the beginning of the freezing step is at least 75%.

The mother liquor during the crystallization step is rendered increasingly poorer in dicyclopentadiene and the temperature falls in accordance with the composition of the mother liquor in equilibrium with the dicyclopentadiene crystals separating out at any temperature.

The crystallization step may be carried out in a variety of different ways to end up with a mother liquor of any desired concentration.

Thus the temperature may be directly decreased until the mother liquor reaches the desired composition, followed by separation of the crystalline mass from mother liquor.

On the other hand, the cooling may be continued to carry the composition of the mother liquor below the desired point and the mass may then be permitted to warm up sufficiently to bring the mother liquor to the desired composition. This is, of course, followed by separation of the crystalline mass from the mother liquor.

A modification of the latter procedure is to permit the mass to warm up during the separation step such as in a centrifuge, in which case it is preferably the composition of the total mother liquor that is used as the guide.

Other procedures for arriving at the same end result, namely avoiding depletion of the mother liquor in dicyclopentadiene content much below 85% at the time of its separation from the crystals, may suggest themselves to persons skilled in the art upon becoming familiar herewith.

If the starting material contains no more than 75–85% dicyclopentadiene, the mother liquor is of course depleted below the above figures but preferably not below 65%, and recrystallization is employed to obtain a practicably pure product. Recrystallization may be carried out in all respects similar to the initial crystallization including the presence or absence of a diluent, it being necessary, of course, to start with a liquid phase either by melting a part or all of the crystal mass to be recrystallized or dissolving a part or all of it in a diluent, or both. When a concentration of at least 90% is reached either by the initial crystallization or by one or more recrystallizations, the product is in condition for final crystallization to a practicably pure dicyclopentadiene.

When the dicyclopentadiene content of the mother liquor is maintained sufficiently high to permit the formation of a crystal mush on cooling, the crystalline dicyclopentadiene which separates is relatively free from harmful impurities such as sulfur compounds and others as yet unidentified, as well as other hydrocarbons, said compounds being retained for at least the most part in the mother liquor depending, of course, upon its original concentration.

Pure dicyclopentadiene freezes at temperatures in the neighborhood of $+33.6°$ C. However, its freezing point is very sharply lowered by even small quantities of other hydrocarbons that normally accompany it. Consequently, it may be found desirable and sometimes necessary to subject dicyclopentadiene prepared by my process to one or more recrystallization steps, with a view to recovering practically pure dicyclopentadiene as an end product. To obtain a practicably pure product the use of a two or more stage process is generally desirable, or necessary if the starting material has a lower concentration than 90%.

As one illustration of my invention, I give the following table:

Table

| Sample | F. P. of charge | Approx. conc. of dicyclo in charge | Charge extracted | F. P. of extract | Conc. of dicyclo in extract |
|---|---|---|---|---|---|
| | °C. | | Percent | °C. | Percent |
| 1 | +32.9 | 99.18 | 47 | 33.3 | 99.92 |
| 2 | +26.0 | 98.0 | 59 | 30.7 | 99.25 |
| 3 | +2.0 | 91.8 | 41 | 26.0 | 98.0 |
| 4 | | 86 | 24 | 2.2 | 92.1 |
| 5 | | 74 | 21 | | 85.7 |

It will be noted that samples 1 and 2 are in a high state of purity. This purity may be brought to almost if not actually 100% by resorting to distillation to remove any accidental contamination.

In sample 2 a higher purity might have been obtained by taking a smaller yield. The same applies to samples 3 to 5.

Samples 3 to 5 are suitable raw materials for one or more additional crystallization steps to produce substantially 100% pure dicyclopentadiene.

Although the data of the table was obtained without the use of a diluent during crystallization, as above pointed out a diluent might have been employed, examples of which are set forth hereinafter.

In carrying out the dicyclopentadiene separation step following the crystallization step, the temperature should preferably be maintained at least sufficiently low to prevent excessive remelting or redissolution of the crystalline dicyclopentadiene.

To complete the separation the crystallized dicyclopentadiene may, if desired, be washed with a solvent, irrespective of whether an added solvent was present during the crystallization step, to remove residual mother liquor also preferably at low temperatures to decrease solution of dicyclopentadiene crystals.

The diluent and/or wash liquid if employed is preferably relatively volatile to facilitate its ready removal from the dicyclopentadiene. It should preferably have a low freezing point and it should preferably decrease the viscosity of the cold dicyclopentadiene to increase the ease of filtration of the crystalline dicyclopentadiene. Examples are normal propyl, isobutyl or normal butyl alcohol, or mixtures of one or more thereof.

Other liquids such as diethyl ether, halogenated hydrocarbons ($CCl_4$; $CH_3Cl$; $CH_3CH_2Cl$; $CH_3Br$; $CH_2CH_2Cl_2$, etc.) and the like, and liquefied low boiling hydrocarbons such as propane, the butanes and the pentanes may likewise be employed. Liquefied ethane also belongs to this group.

Instead of removing water-soluble solvents such as alcohols from the crystals, for example, as by evaporation and/or centrifuging, the crystals including adherent water-soluble solvent may be brought to temperatures above 0° C. and preferably above the melting point of the crystals and the resulting liquid mixture washed with water to remove solvent. The dicyclopentadiene may be separated from water in any desired manner such as by layer formation and decantation.

Although the initial concentration step as applied to light oil, or to the mixture resulting from treating crude cyclopentadiene with heat and pressure to dimerize the cyclopentadiene, may be carried out, broadly speaking, in any desired manner without departing from the generic concept of the invention, yet concentration by distillation under vacuum in the absence of any substantial quantities of steam under conditions such that pot temperatures do not exceed 140° C. when combined with the subsequent fractional crystallization step, presents distinct advantages from the standpoint of quality and/or yield.

Although my invention has been more particularly described in connection with the treatment of crude dicyclopentadiene containing materials derived from the manufacture of gas by processes involving the pyrolytic decomposition of hydrocarbon oil, to which materials it is particularly applicable, it is to be understood that broadly speaking, crude dicyclopentadiene containing materials obtained from any source such as in petroleum cracking processes generally, or in coal distillation or carbonization processes (e. g., the manufacture of coal gas or coke oven gas) may be similarly treated.

The dicyclopentadiene obtained by my process may be stored and/or used as such, or it may be depolymerized to monomeric cyclopentadiene when and as desired.

Cooling during the crystallization procedure may be brought about by any suitable means available in that particular art.

It is to be understood that the above examples are by way of illustration and that changes, omissions, additions, substitutions, and/or modifications might be made within the scope of the claims without departing from the spirit of the invention.

I claim:

1. A method for recovering highly purified dicyclopentadiene from a crude liquid mixture of similarly boiling materials in which the dicyclopentadiene content is at least 90% of said similarly boiling materials which comprises lowering the temperature of said crude liquid mixture sufficiently to form crystals of dicyclopentadiene therein, and separating said dicyclopentadiene crystals from the remaining crude liquid mixture while the dicyclopentadiene content of said remaining crude liquid mixture is at least 85% of said similarly boiling materials therein.

2. A method for treating light oil produced in the manufacture of combustible gas to obtain highly purified dicyclopentadiene therefrom which comprises distilling said light oil under vacuum in the absence of any substantial steam and with pot temperatures below approximately 140° C. to obtain a crude dicyclopentadiene fraction having a boiling range substantially equivalent to one the preponderate portion of which boils between 72° C. and 85° C. at an absolute pressure of 40 mm. of mercury and in which the dicyclopentadiene content is above 90%, reducing the temperature of said crude fraction sufficiently to form crystals of dicyclopentadiene therein, and separating the said dicyclopentadiene crystals from said crude fraction while the dicyclopentadiene content of the uncrystallized portion of said crude fraction is at least 85%.

3. A method for recovering highly purified dicyclopentadiene from a light oil obtained in the manufacture of combustible gas which comprises distilling said light oil to obtain a fraction the preponderate part of which consists of hydrocarbons of five carbon atoms and including cyclopentadiene and at least one other $C_5$ diolefine, subjecting said fraction in the liquid phase to elevated temperatures between 40° C. and 170° C. to selectively dimerize cyclopentadiene to dicyclopentadiene, subjecting the resulting mixture to vacuum distillation in the absence of any substantial steam and with pot temperatures below approximately 140° C. to separate the dimerized hydrocarbons from the more volatile monomeric hydrocarbons and to obtain a fraction in which the dicyclopentadiene content is above 90%, cooling the last-mentioned fraction sufficiently to cause crystals of dicyclopentadiene to form therein, and separating the dicyclopentadiene crystals from said last-mentioned fraction while the dicyclopentadine content of the liquid portion of said last-mentioned fraction is at least 85%.

4. A method for recovering highly purified dicyclopentadiene from a crude mixture of similarly boiling materials derived from light oil produced in the manufacture of combustible gas in which petroleum oil was cracked, the dicyclopentadiene content of said crude liquid mixture being at least 90% of said similarly boiling materials, comprising lowering the temperature of said crude liquid mixture sufficiently to form crystals of dicyclopentadiene therein, and separating said dicyclopentadiene crystals from said crude liquid mixture while the dicyclopentadiene content of the uncrystallized portion of said crude liquid mixture is at least 85% of the content of said similarly boiling materials in said uncrystallized portion.

5. A method for recovering highly purified dicyclopentadiene from a dicyclopentadiene containing liquid mixture of similarly boiling materials derived from light oil, said liquid mixture having a boiling range between 72° C. and 85° C. at 40 mm. mercury absolute pressure and having a dicyclopentadiene content of at least 90%, which comprises cooling said liquid mixture sufficiently to form crystals of dicyclopentadiene therein, stopping said cooling before the crystal content of the total mixture exceeds about 60%, and separating said crystals of dicyclopentadiene from the remaining liquid while the dicyclopentadiene content of said remaining liquid is at least 85%.

6. A method for recovering highly purified dicyclopentadiene from a crude liquid mixture of similarly boiling materials derived from light oil in which the dicyclopentadiene content is at least 90% of said similarly boiling materials, which comprises lowering the temperature of said crude liquid mixture sufficiently to form crystals of dicyclopentadiene therein, and separating said dicyclopentadiene crystals from the uncrystallized portion of said crude liquid mixture while the dicyclopentadiene content of said uncrystallized portion of said crude liquid mixture is at least 85% of said similarly boiling materials.

7. A method for recovering highly purified dicyclopentadiene from a crude mixture of similarly boiling materials derived from light oil, said crude liquid mixture having a boiling range which is the equivalent of between 72° C. and 85° C. at 40 mm. mercury absolute pressure and having a dicyclopentadiene content of at least 90%, which comprises cooling said crude liquid mixture in the presence of an added diluent having a substantially lower boiling point and a substantially lower freezing point than dicyclopentadiene, the concentration of dicyclopentadiene in the presence of said diluent being at least 75%, said cooling of said crude liquid mixture being sufficient to form crystals of dicyclopentadiene therein; and separating said dicyclopentadiene crystals from the remaining liquid while the dicyclopentadiene content of the uncrystallized portion of the crude liquid mixture neglecting said diluent is at least 85%.

8. A method for recovering highly purified dicyclopentadiene from a crude liquid mixture of similarly boiling materials derived from light oil in which the dicyclopentadiene content is less than 90% of said similarly boiling materials, which comprises concentrating dicyclopentadiene by crystallization from said crude liquid mixture to obtain a crystalline mass in which the dicyclopentadiene content is at least 90%, melting at least a part of said crystalline mass to form a liquid phase, subjecting said liquid phase to reduction in temperature sufficient to cause dicyclopentadiene crystals to form therein, and separating said last-named dicyclopentadiene crystals from the remaining liquid phase while the dicyclopentadiene content of said remaining liquid phase is at least 85% of the content of the said similarly boiling materials therein.

9. A method for recovering highly purified dicyclopentadiene from a crude liquid mixture of similarly boiling materials derived from light oil in which mixture the dicyclopentadiene content is at least 90% of the content therein of said similarly boiling materials, which comprises lowering the temperature of the said crude liquid mixture sufficiently to form crystals of dicyclopentadiene therein, separating said dicyclopentadiene crystals from the remaining crude liquid mixture while the content of dicyclopentadiene therein is at least 85% of the content of similarly boiling materials therein, and removing adherent liquid from said dicyclopentadiene crystals by washing said crystals with a solvent for said adherent liquid in which solvent dicyclopentadiene is relatively insoluble under the conditions obtaining, said solvent having a relatively low boiling point and a relatively low freezing point as compared with the boiling point and freezing point respectively of dicyclopentadiene.

ALGER L. WARD.